United States Patent
Nusbaum

(10) Patent No.: US 10,205,308 B2
(45) Date of Patent: Feb. 12, 2019

(54) METHOD FOR REMOVING A CABLE CORE FROM A CABLE SHEATH

(71) Applicant: DEFLUX HOLDINGS LIMITED, London (GB)

(72) Inventor: Laslo Nusbaum, Wulkaprodersdorf (AT)

(73) Assignee: DEFLUX HOLDINGS LIMITED, Somerset (GB)

( * ) Notice: Subject to any disclaimer, the term of this patent is extended or adjusted under 35 U.S.C. 154(b) by 204 days.

(21) Appl. No.: 15/036,684

(22) PCT Filed: Oct. 8, 2014

(86) PCT No.: PCT/EP2014/071517
§ 371 (c)(1),
(2) Date: May 13, 2016

(87) PCT Pub. No.: WO2015/052222
PCT Pub. Date: Apr. 16, 2015

(65) Prior Publication Data
US 2016/0372902 A1    Dec. 22, 2016

(30) Foreign Application Priority Data
Oct. 8, 2013    (GB) .................................. 1317800.9

(51) Int. Cl.
*H05B 3/00*    (2006.01)
*H02G 1/12*    (2006.01)

(52) U.S. Cl.
CPC ......... *H02G 1/1275* (2013.01); *H02G 1/1287* (2013.01); *Y10T 29/49083* (2015.01)

(58) Field of Classification Search
CPC ........ G02B 6/4415; H02G 15/18; H02G 1/00; H02G 1/08; Y10T 428/139;
(Continued)

(56) References Cited

U.S. PATENT DOCUMENTS

| | | | |
|---|---|---|---|
| 4,055,616 A | 10/1977 | Keen et al. | |
| 4,553,877 A | * 11/1985 | Edvardsen | .............. E21B 29/02 |
| | | | 405/183.5 |

(Continued)

FOREIGN PATENT DOCUMENTS

| | | |
|---|---|---|
| AT | 505710 B1 | 3/2009 |
| DE | 3213129 A1 | 10/1983 |

(Continued)

OTHER PUBLICATIONS

HP Innovation—ProCurve Networking; "Preventive Maintenance of Fiber Optic Cables and Optics"—May 2006.

(Continued)

*Primary Examiner* — Thiem Phan
(74) *Attorney, Agent, or Firm* — Nelson, Mullins, Riley & Scarborough LLP

(57) ABSTRACT

A method of removing a metallic cable core that extends through an outer cable sheath of a length of data transmission cable is disclosed. The core is surrounded by a filler material contained within the outer cable sheath as an integral part of the cable. The method comprises the steps of resistively heating the core by supplying electric current to it to reduce the viscosity of the surrounding polymer material; and pulling the core out of one end of the outer cable sheath while the viscosity of the filler material is in a reduced state.

20 Claims, 3 Drawing Sheets

(58) Field of Classification Search
CPC ........ Y10T 29/49083; Y10T 29/49822; H05B 3/00; H05B 3/56
USPC ... 29/611, 33 F, 234, 426.5, 762, 870, 426.1
See application file for complete search history.

(56) References Cited

U.S. PATENT DOCUMENTS

| | | |
|---|---|---|
| 6,088,499 A | 7/2000 | Newton et al. |
| 6,540,208 B1 | 4/2003 | Pecot et al. |
| 7,814,654 B2 | 10/2010 | Puchler |
| 2007/0215375 A1 | 9/2007 | Peng |

FOREIGN PATENT DOCUMENTS

| | | |
|---|---|---|
| DE | 10 2011 087642 A1 | 6/2013 |
| JP | S546082 A | 1/1979 |
| KR | 20010083363 A | 9/2001 |
| WO | WO 2011/037445 A1 | 3/2011 |

OTHER PUBLICATIONS

International Search Report and Written Opinions for International Application PCT/EP2014/071517, dated Jan. 23, 2015.
Official Communication for corresponding European Application No. 14790527.7 dated Feb. 7, 2017.
Search Report for Application No. GB1417766.1, dated Feb. 26, 2015.

* cited by examiner

METHOD FOR REMOVING A CABLE CORE FROM A CABLE SHEATH

CROSS-REFERENCE TO RELATED APPLICATIONS

This application claims priority to and is a 371 application from PCT/EP2014/071517, entitled "Method and Apparatus for Removing a Cable Core from a Cable Sheath", filed Oct. 8, 2014, which claims priority to GB 1317800.9, filed Oct. 8, 2013, both of which are hereby incorporated by reference in their entireties.

FIELD OF THE INVENTION

The present invention relates to a method and apparatus for removing a cable core from a cable sheath.

BACKGROUND OF THE INVENTION

Data, digital or coaxial transmission cables for transmitting data and digital signals into homes have been used for many years and are usually buried underground, often beneath pavements and the front gardens of the homes to which data is being supplied. There are various different cables commonly in use, but a typical cable 1 is shown in FIG. 1 and generally comprises a core 2 formed from a bundle of conductors 3 (only four of which are shown in FIG. 1). Each conductor 3 may comprise a number of stranded copper core filaments 4 twisted together and covered by an insulating polymer sheath 5. A plurality of conductors 3 may be twisted or otherwise bundled together to form the core 2. The conductor bundle forming the core 2 is received in an outer sheath 6 to keep the conductor bundle together and to provide overall mechanical, weather, chemical and electrical protection. The sheath 6 can be formed from aluminium, lead or steel and may have a polymer coating. A filler material 7 is received between the outer sheath 6 and the core 2 and surrounds and fills the interstices of the core 2 formed by the conductor bundle. This filler material 7 can be formed from polymer and is usually soft, although it is sometimes formed from a relatively hard polymeric material. Alternatively, it can sometimes be oil based. The filler material 7 protects and supports the core 2 and can act to seal any nicks or cuts in the outer sheath 6 should they occur, thereby preventing moisture ingress which may lead to consequential failure of the cable 1.

Some cables 1 are also provided with an envelope 8 which surrounds the core 2 and the filler material 7 within the outer sheath 6. This envelope 8 may wind helically around the core 2 and filler material 7 and overlap so as to completely surround or wrap the filler material 7. The envelope 8 is commonly formed from paper, cellophane or similar material, but can also be formed from aluminum foil.

In another, unillustrated, cable type, the envelope is embedded within the filler material so that the filler is between the core and the envelope and between the envelope and the inner surface of the outer sheath. Some cables may also have a further, external envelope (not shown) which surrounds the filler material, in addition to the envelope that is embedded within the filler material. The external envelope separates the filler material that is on the outside of the envelope from the inner surface of the outer sheath. The external envelope may be formed from cellophane, with the internal envelope formed from aluminium or paper.

Developments in technology, together with demand for better and faster data transfer, have recently necessitated the use of optical fibres for data transmission purposes or at least a hybrid core comprising both traditional copper wire and optical fibres, as optical fibre is capable of transmitting much larger quantities of data at high speed relative to traditional copper cored cables. Where optical fibre is required, the standard approach is to disconnect the existing cable and to lay an entirely new cable containing the optical fibre, with the old disconnected copper cored cable either being removed altogether or left in the ground. It will be appreciated that this approach necessitates the digging of a trench in order to lay the new cable, which is disruptive, time consuming and expensive.

U.S. Pat. No. 7,814,654B2 discloses a method for removing a cable core from an outer cable sheath so that the optical fibre can be fed through the vacated outer cable sheath without having to dig a trench. In the method described in this document, a flowable medium is introduced under pressure into an annular space between the core and the sheath, so as to reduce friction between the core and the sheath to the extent necessary to allow the core to be drawn out of the sheath for subsequent insertion of the new optical fibre. However, this method is troublesome as it is difficult to pump the fluid into the annular space between the core and the sheath, especially for cable runs of any length. Relatively high pressures are required to ensure that the fluid has passed along the cable and completely surrounds the core to an extent sufficient to reduce the friction between the core and the sheath and thereby enable the core to be extracted without a high degree of difficulty. The high pressures required may also damage the outer sheath making it impossible to re-use.

BRIEF SUMMARY OF THE INVENTION

The present invention seeks to provide a method and apparatus which substantially overcomes or alleviates problems associated with replacing cable core with optical fibre or a hybrid core of optical fibre and copper filament, such as those identified above.

According to the present invention, there is provided a method of removing a metallic cable core that extends through an outer cable sheath of a length of data transmission cable, the core being surrounded by a filler material contained within the outer cable sheath as an integral part of the cable, the method comprising the steps of:

(a) resistively heating the core by supplying electric current to it to reduce the viscosity of the surrounding filler material; and (b) pulling the core out of one end of the outer cable sheath whilst the viscosity of the filler material is in a reduced state.

As the filler material softens or liquifies at a lower temperature than the material of the outer sheath, it is possible to sufficiently reduce the viscosity of the filler material so that the friction between the core and the outer sheath is reduced, without damaging or altering the outer sheath, thereby enabling the core to be extracted from the outer sheath. Depending upon the length of the cable being treated, it should be possible to simply pull or draw the core out by hand. However, it is envisaged that the core could be pulled or drawn out of the outer sheath by a machine capable of applying sufficient load to the core. It has been found that, in its heated state, the filler material effectively becomes a lubricant that substantially reduces the force required to pull the core out of the outer sheath, that force being substantially lower than the overall tensile strength of the core. Ideally, the pulling step is carried out as soon as a sufficient reduction in the viscosity of the filler material has occurred and before its temperature drops to a point at which the filler material has regained its original viscosity. As it may be difficult to maintain a supply of current to the core simultaneously to the pulling step, ideally the core is pulled immediately after disconnection of the current supply to the core.

The method may include the step of terminating the supply of electric current to the core prior to carrying out step (b). In this case, the core is preferably extracted immediately after the supply of electrical current is terminated.

Step (a) may comprise heating the core by supplying it with electric current having an amperage range of between 30 A to 90 A, a voltage of between 24V and 110V. The current may be supplied for a period of between 2 and 7 minutes.

The method may further include the step of attaching a draw-string to the end of the core prior to carrying out step (b), so that the draw-string is pulled through the outer sheath simultaneously with the drawing of the cable core out of the outer sheath.

Alternatively, the draw-string may be fed through the outer sheath after the cable core has been pulled from the outer sheath in step (b).

In a preferred embodiment, the method includes the step of flushing the outer sheath to remove and/or dissolve residual filler material after the cable core has been pulled from the outer sheath in step (b). Flushing the outer sheath may comprise forcing pressurised fluid down the outer sheath.

The flushing step may also include forcing pressurised fluid down the outer sheath from one end, whilst closing the other end of the outer sheath until a predetermined pressure within the outer sheath has been reached.

Pressurised flushing fluid may be retained in the outer sheath for a predetermined period of time.

In an alternative embodiment, the step of flushing comprises inserting a draw-string through the outer sheath across any remaining filler material deposits, attaching a cleaning element to said draw string and pulling said cleaning element through the outer sheath.

Preferably, a second draw string is attached to the cleaning element so that pulling of the cleaning element through the outer sheath also pulls said second draw string through the outer sheath.

The cleaning element may comprise a cloth or brush and the cloth or brush may be soaked in a solvent, such as ethanol.

If the cable to which the method is being applied has a string extending between an inner surface of the outer sheath and an envelope surrounding the core, the method may then include the step of retaining said string in position within the outer sheath during core and envelope extraction and attaching a new core to said string prior to pulling said string to draw said new core down said outer sheath.

The step of retaining the string in position in the outer sheath comprises the step of attaching one end to an external surface of the outer sheath and extracting the core and the envelope from said opposite end of the cable.

If the cable from which a cable core is to be removed includes an envelope between the filler material and the outer sheath, the method preferably includes the further step of releasing said envelope from the outer sheath after extraction of the core in step (b) by jetting compressed air along the outer sheath.

The method preferably comprises the step of applying an initial pulling force to the envelope protruding from one end of the outer sheath prior to pulling the envelope out of the cable sheath from the opposite end, after jetting compressed air along the outer cable sheath. The method may include the step of applying an initial pulling force to the envelope until a portion of the envelope breaks within the outer cable sheath and prior to pulling the remaining portion of the envelope from the opposite end of the outer cable sheath.

Preferably, lubricating agent is supplied or is contained in the compressed air as it is jetted into the outer cable sheath.

According to another aspect of the invention, there is provided apparatus for removing a metallic cable core extending through an outer cable sheath of a length of data transmission cable in which the cable core is surrounded by a filler material contained within the outer cable sheath as an integral part of the cable, the apparatus including an electrical generator for generating current and wires extending from the generator for connecting the apparatus to a cable core for supplying electrical current to the cable core, wherein the apparatus includes a housing containing the generator and an integral draw-string storage reel for supplying draw-string into the outer sheath following, or during, removal of the core.

In a preferred embodiment, a supply of draw string material is contained on said draw string storage reel in said housing. The draw string material is preferably made from a polymeric material.

The apparatus may also include a feeding mechanism for pushing draw-string off the reel and along the outer sheath.

According to another aspect of the invention, there is provided an apparatus for removing a metallic cable core extending through an outer cable sheath of a length of data transmission cable in which the cable core is surrounded by a filler material contained within the outer cable sheath as an integral part of the cable, the apparatus including an electrical generator for generating current and wires extending from the generator for connecting the apparatus to a cable core for supplying electrical current to the cable core, wherein the apparatus includes a user operable selector for setting the amperage to be generated, and an amp meter connectable directly to the cable core to provide a measure of the actual amperage in the cable core.

The apparatus may comprise a controller, a timer, a programmable memory, and a cable-type selection switch, and the memory may be configured to store data such as amperage, voltage and current supply time for a plurality of different cable types, such that user may select said parameters in dependence on a particular cable type from which a cable core is to be removed via said cable-type selection switch.

It will be appreciated that the method and apparatus of the invention is applicable to a variety of cable lengths, but it is ideally suited to shorter lengths and, in particular, those lengths of cable which extend from beneath a road or pavement and under a front garden and into a property or building.

BRIEF DESCRIPTION OF THE DRAWINGS

Embodiments of the invention will now be described, by way of example only, with reference to FIGS. 2a to 2e of the accompanying drawings, in which.

DETAILED DESCRIPTION

Figure 1:
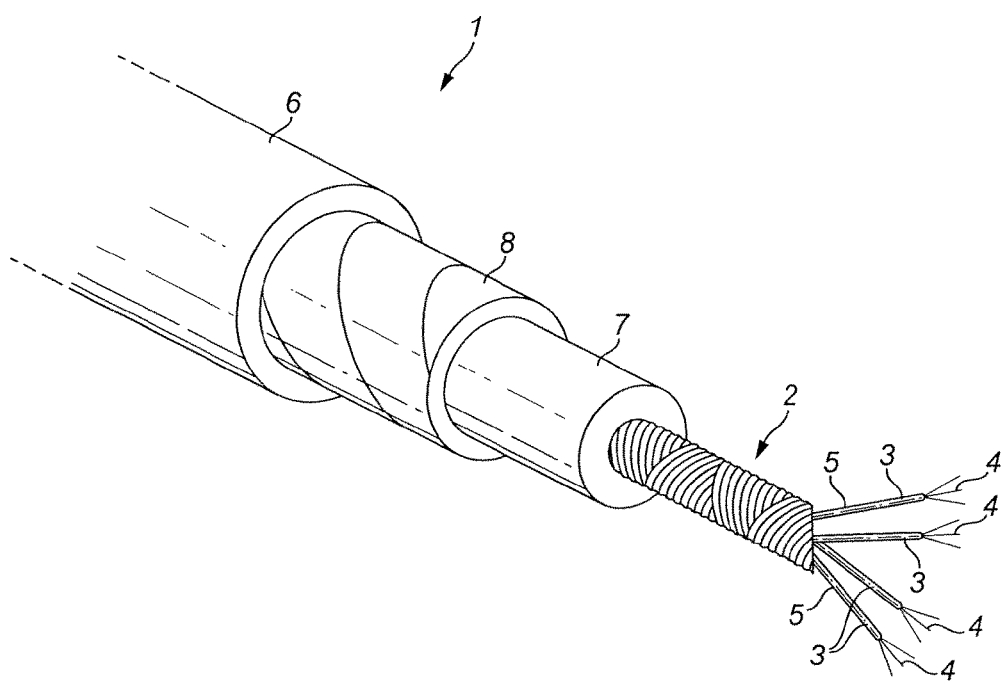
FIG. 1 is a perspective view of an end portion of one type of traditional copper cored cable with the various layers shown stripped back to illustrate its construction.

As described above, a perspective view of an end of one type of conventional cable 1 is shown in FIG. 1 and comprises a core 2 formed from a bundle of conductors 3. Each conductor 3 may comprise a stranded copper core 4 formed from a number of filaments 5 covered by an insulating sheath formed from polyethylene. Groups of conductors 3 may be twisted or bundled together to form the core 2. The insulated conductor bundle 2 is received in an outer polymer sheath 6, also formed from polyethylene, to keep the conductor bundle 2 together and to provide overall mechanical, weather, chemical and electrical protection. A filler material 7 is received between the outer sheath 6 and the conductor bundle 2 and surrounds and fills the interstices of the conductor bundle 2. A wrapper, such as cellophane may be interposed between the filler material 7 and the outer sheath 6. Cables 1 of this type are commonly used for local area networks and may be buried underground.

To remove the conductor bundle/core 2 from the outer sheath 6, a direct or alternating electric current is supplied to the core 2 so that its temperature is elevated to a sufficient level in order to melt the filler material 7 or to at least reduce its viscosity to a level at which the core 2 may be removed from the outer cable sheath 6 by pulling it either by hand, or using an extraction tool. The force that is applied to the core 2 to extract it from the outer cable sheath 6 must be less than the tensile strength of the core 2, as otherwise the core 2 will break within the outer cable sheath 6 and can no longer be removed. By heating the filler material 7, the friction between the core 2 and the inner wall 9 of the outer cable sheath 6, or at least between the core 2 and the wrapper 8, is reduced so that the core 2 can slide out of the outer cable sheath 6 relatively easily and with little load applied to the core 2, leaving the wrapper 8 behind. The filler material 7 changes its state at a temperature which is lower than a temperature which would have any effect on the outer cable sheath 6. Therefore, the outer cable sheath 6 remains undamaged during the current supply and heating step.

Figure 2A:
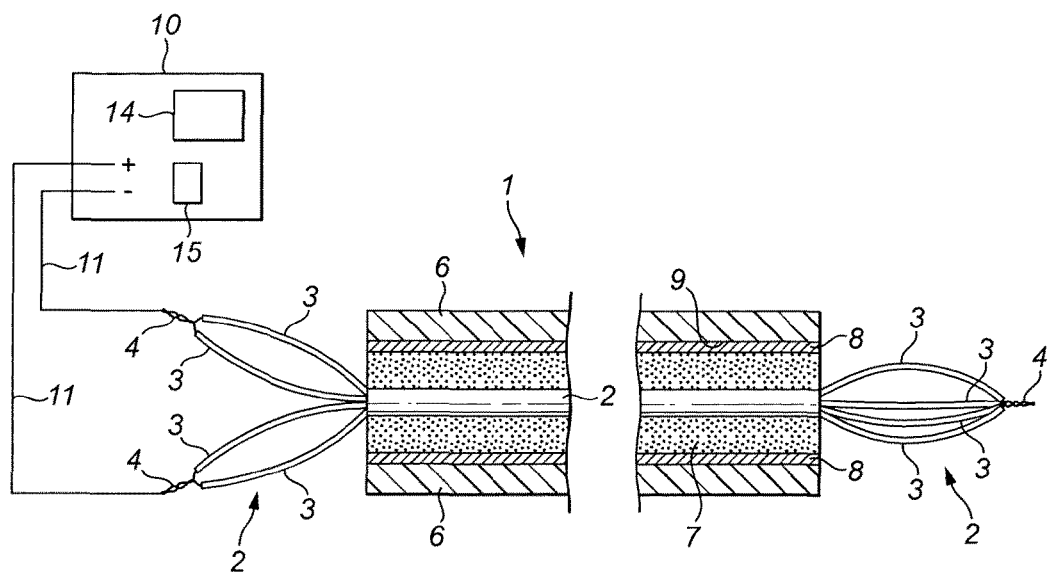
FIG. 2a shows a schematic cross-sectional side view of a length of traditional copper cored cable prepared and readied for carrying out the method of the invention.

A section of cable 1 for which the core 2 is to be removed is shown in FIG. 2a. Only the end sections of the cable 1 are shown in FIG. 2a, but the length of the cable may be in the order of 10-20 meters or so. To provide the required current necessary to heat the core 2 and so melt or reduce the viscosity of the filler material 7, an electrical generator 10 (see FIG. 2a) is provided. The generator 10 has connecting wires 11 representing positive and negative poles. Clamps (not shown) are attached to the end of each of the wires 11 to enable them to be quickly and easily connected to, and disconnected from, the cable core 2. The mating faces of each clamp that make contact with the core 2 are be flat, rather than serrated or toothed, so as to ensure proper connection between the clamps of the electrical generator 10 and the core 2.

At the end of the cable core 2 which is to be connected to the generator 10, the conductors 3 are divided into two groups and the insulation material stripped back to reveal the filaments of each conductor 3. All the filaments of the conductors belonging to the same group are electrically connected together, such as by twisting the filaments together. The positive wire from the generator 10 is then connected to one group and the negative wire from the generator 10 is connected to the other group, using the clamps. At the opposite end of the cable length, the insulation material of all the conductors is stripped back, but rather than separate the conductors into groups, all the conductors are electrically connected to each other. When the generator 10 is activated, current will flow in both directions, i.e. from the generator 10 along the core via one conductor group and then back down the core in the opposite direction via the other conductor group.

Heat is generated in the core due to resistive heating. The amount of heat released is proportional to the square of the current according to Joule's first law. By using a relatively high current at a relatively low voltage, a sufficient amount of heat is generated in the core 2 to melt the filler material 7. The exact current and voltage required is largely dependent on the cable 1 whose core 2 is to be extracted, although the Applicant's have found that a supply capable of delivering 30 to 90 Amps with a voltage of between 24 and 110 Volts is sufficient for most cable types. Generally, the current should be applied to the core 2 for a period of between 2 and 7 minutes.

The generator 10 includes a gauge for indicating the generated current. A separate meter, connectable directly to the cable core 2, may provide a further amperage reading indicative of the actual amperage in the cable core 2, so that account may be taken of any losses in the wires 11 or connections to the core 2 via the clamps.

The exact parameters to be used for a particular cable type may be determined from data obtained from previous tests conducted on similar cable types, so that an operator will know exactly what voltage, amperage and time period is required once the cable-type has been determined by visual inspection. The operator may then input the required settings into the generator 10 prior to heating. In a further development, the electrical generator 10 may be provided with a controller, a memory, and a cable-type selector. In this case, the required amperage and voltage that have been previously determined for a particular cable type may be pre-programmed into the memory so that an on-site operator is only required to input the cable-type via the selector and the generator 10 will use the previously stored settings held in the memory. The generator 10 may also include a timer to control the period for which the current is applied. An appropriate time period may also be determined based on previous tests and can be stored in the memory together with amperage and voltage values. By having data for different cable types stored in the memory of the apparatus, the speed of the process can be greatly increased. The possibility for an operator to use the wrong settings, which could result in damage to the outer sheath 6 or an inability to properly extract the cable core 2, is also reduced.

Figure 2B:
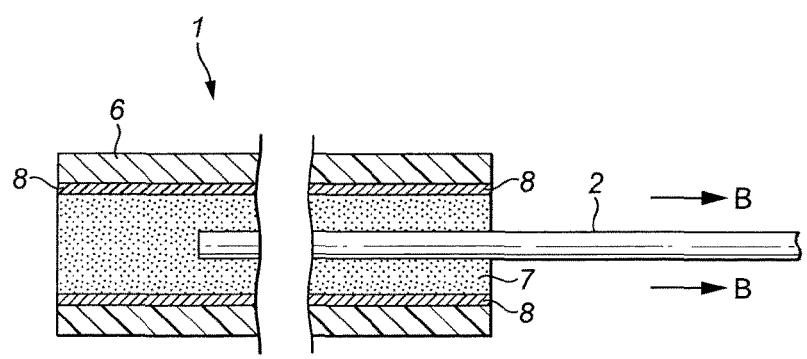
FIG. 2b shows the length of cable of FIG. 2a with the cable core partially removed from the outer cable sheath.

Once the filler material 7 has been heated to a temperature at which its viscosity is reduced sufficiently, the electrical generator 10 is disconnected from one end of the core 2 and then a force is applied to pull the core 2 from the outer sheath 6 from the opposite end. FIG. 2*b* shows the cable of FIG. 2*a* after the generator 10 has been disconnected and the core 2 has been partially removed from the outer sheath 6 of the cable 1 by pulling it in the direction of arrow 'B'.

If the cable 1 to which the method is being applied does not have an envelope or paper wrapper 8, then it is possible to attach, tie or hook a draw-string to the end of the core 2 so that the draw-string is pulled into and through the outer sheath 6 from one end as the core 2 is pulled out of the opposite end. This speeds up the process, as it is not necessary to insert a draw-string into the outer sheath 6 in a separate method step following core removal. This method also applies to cables in which there is filler material 7 surrounding the envelope 8 and there is no external envelope 8 between the filler material 7 and the inner surface 9 of the outer sheath 6, as the filler 7 in this region will also melt/reduce in viscosity to allow the core 2 and envelope 8 to be removed as one.

Figure 2C:
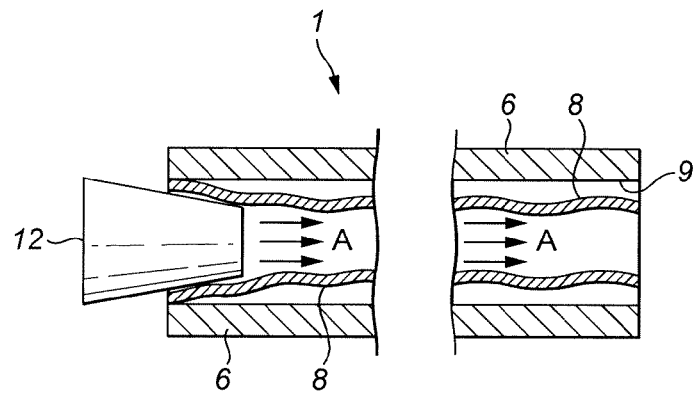
FIG. 2c shows the length of cable of FIG. 2b after the cable core has been completely removed and compressed air has been jetted down the cable from a nozzle inserted into one end.
Figure 2D:
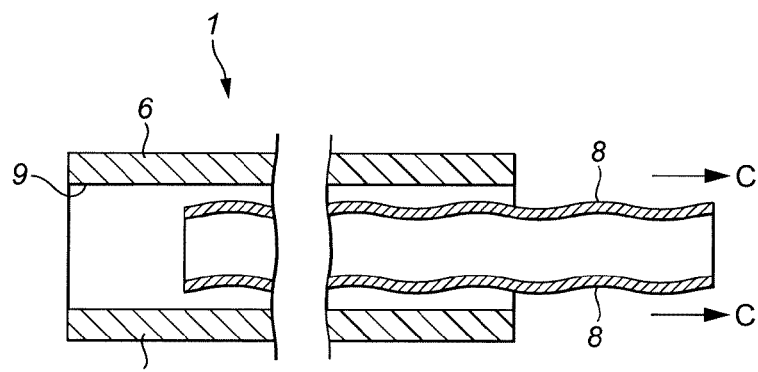
FIG. 2d shows the length of cable of FIG. 2C with the paper wrapper partially extracted from the outer sheath.
Figure 2E:
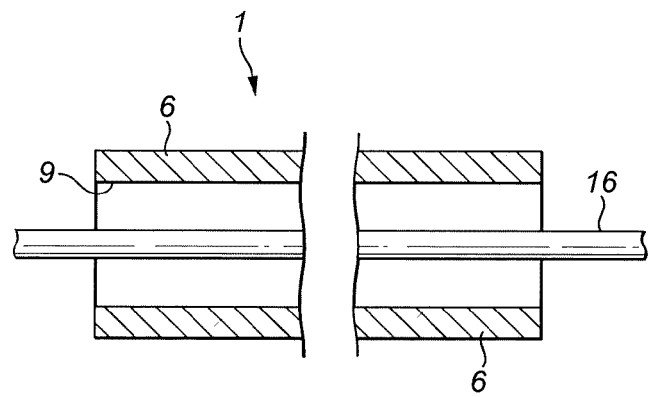
FIG. 2e shows the length of cable of FIG. 2d with the paper wrapper completely removed and a draw-string extending through the outer sheath.

In the cable length shown in FIGS. 1 to 2*d*, a paper wrapper envelope 8 is shown. This envelope 8 is wound helically and surrounds the filler material 7 and so there is no filler 7 between the envelope 8 and the inner surface 9 of the outer sheath 6. This envelope or wrapper 8 is can be made of paper or cellophane and is not extracted together with the core 2 when the core 2 is pulled from the outer sheath 6, as the friction between the envelope 8 and the outer sheath 6 is not reduced as a result of heating the core 2.

However, as the wrapper 8 may at least partially block the outer sheath 6 and prevent subsequent insertion of the draw-string and/or the new optical fibre, it must be removed prior to any attempt to insert the draw-string/optical sheath into the outer sheath 6. The same method also applies to cables in which there is an internal envelope and an external envelope surrounding the filler material 7 so that the region between the external envelope and the inner surface 9 of the outer sheath 6 is dry.

As the wrapper 8 may be adhered to the inner surface 9 of the outer sheath 6, it cannot simply be removed by pulling it from one end, as the wrapper 8 will simply break inside the outer sheath 6 making it even harder to extract. However, the Applicant's have found that the wrapper 8 can be released from the inner surface 9 of the outer sheath 6 by jetting compressed air or an inert gas ('A' in FIG. 2*c*), preferably containing a small amount of lubricating agent such as oil, down the outer sheath 6 from one end. The compressed air or gas and oil mixture passes around and between the overlapping windings that form the wrapper 8 and detaches it from the inner surface 9, as well as separating the overlapping regions of the windings from each other. FIG. 2*c* shows a nozzle 12 pushed into the end of the outer sheath 6 for the supply of compressed air and lubricant from a compressed air/lubricant source (not shown) down the outer sheath 6. The paper wrapper 8 is also shown in a state in which it has now been partially detached from the inner surface 9 of the outer sheath 6 and is held loosely within the outer sheath 6.

Once compressed air has been forced down the outer sheath 6, it may then be possible to pull the envelope 8 out of the outer sheath 6 from one end. However, certain types of envelope 8 comprise a helically wound ribbon of cellophane material extending around the filler 7 that also includes a number of yarns or strings that extend around the cellophane or which are incorporated within it. It has been found that, with envelopes 8 of this type, the friction between the wrapper 8 and the inner surface of the outer sheath 9 is still relatively high even after jetting compressed air along the outer sheath 6, so it is still not possible to slide it out, especially when the length of cable exceeds 15 meters or so. However, it has been found that if the wrapper 8 is initially pulled from one end of the cable 1, preferably until it snaps inside the outer sheath 6, and the broken portion is drawn out from that end of the outer sheath 6 before pulling the remaining portion from the opposite end of the outer sheath 6 (by pulling it in the direction of arrow 'C' in FIG. 2*d*), the remaining portion will slide out relatively easily. The initial pulling/snapping step from one end tends to pull the strings or yarns taught or straighter within the outer sheath 6 thereby pulling the wrapper 8 away from the inner surface 9, making it easier to subsequently draw the remaining portion of the envelope 8 out from the opposite end of the outer sheath 6. It will be appreciated that this additional pulling of the wrapper 8 from one end so that it snaps prior to pulling it from the opposite end is not always essential and, for shorter cable runs, less than 15 meters for example, it may still be possible to extract the wrapper 8 from one end without initially pulling it from the opposite end first.

Removal of the paper wrapper 8 by the application of compressed air and, optionally, a lubricant is preferably carried out immediately after core 2 extraction and when any remaining filler material 7 remaining in the outer sheath 6 has not fully cooled and so still has a relatively low viscosity. Wrapper removal is made more difficult if any remaining filler 7 is allowed to regain its normal state, especially if the ambient temperature is relatively low, as the residual filler 7 can increase the friction between the paper wrapper 8 and the inner surface 9 of the outer sheath 6.

Once the paper wrapper 8 has been extracted, a draw-string 16 can be pushed into the now empty sheath 6 using a known feeding mechanism, which may be integrated into the generator housing 13. An optical fibre can be attached to one end of the draw-string and the draw-string pulled to draw the optical fibre through the outer sheath 6.

The electrical generator 10 has a housing 13 containing the circuitry required for generating the current at the required level. However, the housing 13 may also be provided with a draw-string storage reel 14 within the housing 13 on which is wound a length of draw string 16, which may be made from steel or, more preferably, a polymer material. The housing 13 may also contain a feeding mechanism 15 for feeding draw string from the reel 14 for insertion through a vacated cable sheath 6.

In certain applications, an issue arises in that some residual filler material 7 remains within the outer sheath 6 after core extraction, as it quickly solidifies within the outer sheath 6. This residual filler 7 can block or at least partially obstruct the outer sheath 6 and so make it difficult, if not impossible, to pull the new optical fibre through the outer sheath 6. To overcome this issue, it is proposed to flush the outer sheath 6 with fluid after core extraction and prior to insertion of the new core. This can be achieved by attaching a fluid coupling to one end of the cable 1 and forcing pressurised fluid down the outer sheath 6. Preferably, the fluid is a solvent, such as ethanol, or another type of fluid which softens or dissolves the residual filler material 7 to an extent sufficient to carry it out of the outer sheath 6. The fluid may be flushed down the outer sheath 6 continuously until all the residual filler 7 has dissolved or until it has been flushed out of the outer sheath 6. Alternatively, fluid may be supplied into the outer sheath 6 from one end of the cable 1 whilst the other end is closed off. The fluid may then be pumped into the outer sheath 6 until a certain pressure has been reached. The fluid may then be allowed to remain in the outer sheath 6 for a period of time sufficient to allow the residual filler material 7 to dissolve. Upon expiry of a predetermined time period sufficient to enable all the residual filler material 7 to dissolve, the fluid is allowed to drain out of the sheath 6 for collection and subsequent disposal in an environmentally friendly way. If required, all the fluid may be driven out of the outer sheath 6 by jetting compressed air along it.

Once the outer sheath 6 has been flushed, a new copper, optical fibre or hybrid core may be pushed directly down the outer sheath 6. However, it is preferable if a draw-string is inserted and pushed all the way through the outer sheath 6 so that the new core can be attached to one end of it and pulled through the outer sheath 6 by pulling the draw-string from the opposite end.

Instead of flushing fluid along the outer sheath 6, any residual filler 7 may be cleaned from the inside of the outer sheath 6 by initially pushing a draw-string along it which, if sufficiently strong and rigid, can force its way through any residual filler deposits. Once the draw-string is in place, a cleaning element may be attached to the end of the inserted draw-string. The cleaning element may be a brush or a piece of absorbent material or cloth such as cotton, which may have a degree of elasticity, or some other flexible and absorbent plug or bullet that will compress to fit within the outer sheath 6. The element may be dipped in a solvent material prior to pulling the draw-string to draw the cleaning element through the outer sheath until it emerges from the opposite end of the outer sheath 6. The cleaning element dissolves and/or cleans any residual filler material 7 out of the outer sheath 6.

In preferred embodiments, a second draw-string is attached to the cleaning element so that, as the cleaning element is pulled through in response to pulling on the first draw string, the second draw string is also pulled through the outer sheath behind the cleaning element. Once the cleaning element emerges from the opposite end of the outer sheath 6, it can be detached from the second draw-string. The second draw-string can then be attached to the new core to be inserted into the cleaned outer sheath 6 to enable it to be pulled through into its final position within the outer sheath 6.

Embodiments of the invention are also applicable to certain types of cable 1 that have a core 2 surrounded by a cellophane wrapping and a string extending along the outer sheath 6 between the inner wall 9 of the outer sheath 6 and the wrapper or envelope 8 that forms an integral part of the existing cable 1. This 'external' string, which forms an integral part of the cable 1 and is provided within it during manufacture of the cable 1, can be used as a draw-string to pull through the new core once the original core has first been removed, followed by the wrapper 8. It is important to ensure that, during extraction of the core 2, and the wrapper 8, the external string is not damaged or removed. During preparation of the cable end for core extraction, a portion of the outer sheath 6 at the end of the cable 1 is removed to expose a short section of the core 2 and the external string. This provides an opportunity to separate a short section of the end of the external string from the core 2 which is then folded back across the outside of the outer sheath 6 which can then be taped or otherwise held in place against the outer surface of the outer sheath 6, i.e. directly to the outside of the cable 1, possibly using a nylon tie-wrap or such like. This will hold the external string in place during heating, core extraction and wrapper extraction using any of the techniques already described above and, will especially prevent the string from being pulled or drawn into the outer sheath 6 and 'lost' inside it during core extraction or wrapper extraction when they are pulled from the opposite end of the cable 1.

Once secured, and the core 2 and wrapper 8 removed, a fluid coupling can be attached to the outer sheath 6 over the tied string end to enable any flushing of the outer sheath 6 to be carried out. The fluid coupling may be attached to the outside of the cable 1 using a compression joint to prevent leakage of flushing fluid. As the string is tied in place against the outside of the cable 1, it will not be pushed into the outer sheath 6 under the pressure generated by the flushing fluid and will remain clamped to the outside of the sheath 6, yet still be accessible once the fluid coupling is removed after flushing is complete.

In addition to an external string, certain cables may also incorporate strings within the wrapping 8 and which may cross-over each other and extend helically around the core 2 together with the wrapping 8. These strings provide pull strength to the wrapping to enable its removal once the core 2 has been extracted, so it is important not to damage these during preparation and heating and extraction of the copper core 2.

Certain cable types may also include one or more internal strings which are integral with the cable 1 and incorporated into it during manufacture, i.e. beneath the wrapping 8. These strings may be removed together with the core 2 and are grouped and clamped together with it at the extraction end of the cable 1. These internal strings provide additional pull strength to the core 2 during extraction. One type of cable that has an 'external' straight string inside the outer sheath 6, but outside the wrapping 8, two further strings together with the wrapping 8 that cross over each other, and two further internal straight strings within the wrapping 8 incorporated within the core 2, is known and is referred to in the industry as the 'Superior Essex 6×22 gauge' cable. Many modifications and variations of the invention falling within the terms of the following claims will be apparent to those skilled in the art and the foregoing description should be regarded as a description of the preferred embodiments of the invention only.

The invention claimed is:

1. A method of removing a metallic cable core that extends through an outer cable sheath of a length of data transmission cable, the core being surrounded by a filler material contained within the outer cable sheath as an integral part of the cable, the method comprising the steps of:
   (a) resistively heating the core by supplying it with electric current to reduce the viscosity of the surrounding filler material; and
   (b) terminating the supply of electric current to the core prior to
   (c) pulling the core out of one end of the outer cable sheath whilst the viscosity of the filler material is in a reduced state.

2. The method according to claim 1, wherein step (a) comprises heating the core by supplying it with electric current having an amperage range of between 30 A to 90 A.

3. The method according to claim 1, wherein step (a) comprises heating the core by supplying it with a voltage range of between 24V and 110V.

4. The method according to claim 1, wherein step (a) comprises supplying a current to the core for a period of between 2 minutes and 7 minutes.

5. The method according to claim 1, including the step of attaching a draw-string to the end of the core prior to carrying out step (c) so that the draw-string is pulled through the outer sheath simultaneously with the drawing of the cable core out of the outer sheath.

6. The method according to claim 1, comprising the step feeding a draw-string through the outer sheath after the cable core has been pulled from the outer sheath in step (c).

7. The method according to claim 1, comprising the step of flushing the outer sheath to remove and/or dissolve residual filler material after the cable core has been pulled from the outer sheath in step (c).

8. The method according to claim 7, wherein flushing the outer sheath comprises forcing pressurised fluid down the outer sheath.

9. The method according to claim 8, wherein the flushing step includes forcing pressurised fluid down the outer sheath from one end, whilst closing the other end of the outer sheath until a predetermined pressure within the outer sheath has been reached.

10. The method according to claim 9, including the step of leaving pressurised fluid in the outer sheath for a predetermined period of time.

11. The method according to claim 7, wherein the flushing step comprises inserting a draw-string through the outer sheath across any remaining filler material deposits, attaching a cleaning element to said draw string and pulling said cleaning element through the outer sheath.

12. The method according to claim 11, wherein a second draw string is attached to the cleaning element so that pulling of the cleaning element through the outer sheath also pulls said second draw string through the outer sheath.

13. The method according to claim 11, wherein the cleaning element comprises a cloth or brush.

14. The method according to claim 13, wherein said cloth or brush is soaked in solvent.

15. The method according to claim 1, wherein, when the cable to which the method is being applied has a string extending between an inner surface of the outer sheath and an envelope surrounding the core, the method includes the step of retaining said string in position within the outer sheath during core and envelope extraction and attaching a new core to said string prior to pulling said string to draw said new core down said outer sheath.

16. The method according to claim 15, wherein the step of retaining said string in position in the outer sheath comprises the step of attaching one end to an external surface of the outer sheath and extracting the core and the envelope from said opposite end of the cable.

17. The method according to claim 1, wherein if the cable from which a cable core is to be removed includes an envelope between the polymer material and the outer sheath, the method includes the further step of releasing said envelope from the outer sheath after extraction of the core in step (c) by jetting compressed air or gas along the outer sheath.

18. The method according to claim 17, comprising the step of applying an initial pulling force to the envelope protruding from one end of the outer sheath prior to pulling the envelope from the opposite end of the outer cable sheath, after jetting compressed air or gas along the outer cable sheath.

19. The method according to claim 18, wherein the method includes the step of applying an initial pulling force to the envelope until a portion of the envelope breaks within the outer cable sheath, prior to pulling the remaining portion of the envelope from the opposite end of the outer cable sheath.

20. The method according to claim 17, including the step of supplying lubricating agent to the compressed air so that compressed air or gas and lubricating agent are jetted along the outer cable sheath.

* * * * *